United States Patent
Giraudet

(10) Patent No.: US 8,096,656 B2
(45) Date of Patent: Jan. 17, 2012

(54) MULTI-TINT COLOURED OPHTALMIC LENSES

(75) Inventor: Guillaume Giraudet, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 0 days.

(21) Appl. No.: 12/514,544

(22) PCT Filed: Nov. 15, 2007

(86) PCT No.: PCT/FR2007/052344
§ 371 (c)(1),
(2), (4) Date: May 12, 2009

(87) PCT Pub. No.: WO2008/059175
PCT Pub. Date: May 22, 2008

(65) Prior Publication Data
US 2010/0053550 A1 Mar. 4, 2010

(30) Foreign Application Priority Data
Nov. 17, 2006 (FR) .................... 06 10095

(51) Int. Cl.
*G02B 7/10* (2006.01)
*G02B 7/06* (2006.01)

(52) U.S. Cl. .......... 351/165; 351/169; 351/177
(58) Field of Classification Search ........... 351/165, 351/169, 177
See application file for complete search history.

(56) References Cited

U.S. PATENT DOCUMENTS

| 3,454,332 A | 7/1969 | Siegel |
| 3,628,854 A | 12/1971 | Jampolsky |
| 5,408,278 A | 4/1995 | Christman |
| 5,528,322 A * | 6/1996 | Jinkerson ............ 351/163 |
| 6,811,258 B1 | 11/2004 | Grant |
| 6,827,440 B2 * | 12/2004 | Ocampo ............. 351/162 |
| 2006/0092374 A1 | 5/2006 | Ishak |
| 2006/0238703 A1 | 10/2006 | Ramos |
| 2010/0060850 A1 * | 3/2010 | Giraudet ............. 351/165 |
| 2010/0091240 A1 * | 4/2010 | Drobe et al. ......... 351/165 |
| 2010/0103371 A1 | 4/2010 | Sarver et al. |

FOREIGN PATENT DOCUMENTS

| FR | 1179188 | 5/1959 |
| FR | 2389912 | 12/1978 |
| FR | 2418478 | 9/1979 |
| WO | 97/31286 | 8/1997 |

* cited by examiner

*Primary Examiner* — Scott J Sugarman
(74) *Attorney, Agent, or Firm* — Occhiuti Rohlicek & Tsao LLP

(57) ABSTRACT

The invention relates to an ophtalmic lens comprising, on its surface, a first central zone preferentially transmitting the long wavelengths of the visible spectrum, and a second peripheral zone preferentially transmitting the short wavelengths of the visible spectrum.

12 Claims, 1 Drawing Sheet

MULTI-TINT COLOURED OPHTHALMIC LENSES

The present invention relates to the field of the colouration of ophthalmic lenses. More particularly, the invention relates to a novel design for the multi-tint colouration of ophthalmic lenses.

Within the meaning of the invention, by "ophthalmic lenses" is meant corrective and non-corrective lenses and also masks and other vision devices intended to be worn in front of the eyes.

With age, the different structures involved in visual function undergo modifications. The crystalline lens, a biconvex lens situated behind the iris, is involved in the process of focussing images onto the retina when the viewed object changes distance. This process, called accommodation, alters with age: the crystalline lens loses its ability to change curvature when an object is close to the eye, for example when reading, thus reducing the ability of the eye to see close objects; this is presbyopia. In addition to this alteration in the ability to accommodate, the crystalline lens also undergoes histological modifications which cause in particular an increase in the absorption and dispersion of visible light in the short wavelength range, i.e. blue light, which gives rise to functional disorders of sensitivity to contrast and sensitivity to glare which appear and/or become accentuated with age. In order to combat the deleterious effects of the poorer quality of transmission of blue light in the aged crystalline lens, yellow filters are recommended. These filters, by specifically cutting out the short wavelengths, thus reduce the difficulties linked to veiling glare and improve the perception of contrasts.

Such filters are in particular described in Wolffsohn et al., *Optometry and Vision Science*, volume 77(2), pages 73-81, (2000). The works of Wolffsohn show that cutting out the short wavelengths by yellow filters increases the perception of contrast, in particular when viewing luminous objects against an overall blue background, such as the sky.

US 2006/0092374 describes optical lenses combined with "Rugate" type filters, selectively blocking blue light. These lenses offer improved quality of light transmission and clarity of vision. US 2006/0092374 also describes the use of such lenses for treating in particular macular degeneration and cataracts.

The recent works of Herljevic et al., *Exp Gerontol.*, volume 40(3), pages 237-42 (2005), however show the loss of short wavelengths from the light environment to be a factor in the malfunctioning of the biological clock, widely noted in elderly people whose yellowed crystalline lens now only allows a little blue light to pass through.

Wearing yellow filters regularly and for prolonged periods could therefore prove detrimental to the regulation of the wake-sleep cycles, as attested by recent studies of the neurophysiology of vision showing that the mechanisms for regulating the biological clock are linked to the illumination of the eye by the short wavelengths of visible light.

Whilst the needs expressed in terms of visual acuity or sensitivity to contrast are already satisfied by yellow-orange filters, visual needs relating to the regulation of the circadian rhythm on the other hand do not yet seem to have been the object of specific ophthalmic products. The international application WO94/09851 certainly describes a system for regulating the circadian rhythm but this is not an ophthalmic product and this system does not distinguish the action of light on the circadian rhythm in terms of specific wavelengths.

Thus, at present there is no tinted lens system making it possible to respond simultaneously to both these needs.

The technical problem that the present invention proposes to solve is that of improving sensitivity to contrast and reducing the susceptibility to glare of people suffering from an alteration in the transparency of the crystalline lens as described in the introduction, while reducing or avoiding any disturbance in their circadian rhythm due to the absence of blue light.

This problem has been solved according to the present invention using lenses comprising both a central zone capable of absorbing the short wavelengths, corresponding essentially to the zone of the lens explored by the view of the user, and a peripheral zone capable of transmitting mainly the short wavelengths and therefore absorbing the long wavelengths. This last zone surrounds the central zone, and is not generally covered by the view of the user. Whereas the central zone absorbing the short wavelengths (less than 480 nm) in the viewing zone plays the well-known role of improving sensitivity to contrast, the peripheral zone, outside the viewing zone, increases the short wavelength component (blue) of the light penetrating into the eye, and thus compensates for the absorption of the latter by the central zone.

As a result a subject of the present invention is an ophthalmic lens, characterized in that it comprises, on its surface,
- a first, central, zone exhibiting a transmission of less than 50% in the short wavelength range comprised between 400 nm and 480 nm, and a transmission of greater than 50% in the long wavelength range comprised between 480 nm and 700 nm, and
- a second, peripheral, zone exhibiting a transmission of greater than 50% in the short wavelength range comprised between 400 nm and 500 nm, and a transmission of less than 50% in the long wavelength range comprised between 500 nm and 700 nm.

A subject of the invention is also the use of such an ophthalmic lens for producing spectacles intended to improve the sensitivity to contrast and to reduce the susceptibility to glare of people suffering from an alteration in the transparency of the crystalline lens while reducing or avoiding a disturbance in their circadian rhythm. These people are generally people aged over 60 years, preferably over 70 years, and in particular over 75 years.

Finally, a subject of the invention is a method for the symptomatic treatment of the disorders linked to an alteration in the transparency of the crystalline lens and for the prophylactic treatment of the disturbance in the circadian rhythm, comprising the prescription of spectacles with such ophthalmic lenses.

The adjective "central" used to describe the filter zone absorbing the short wavelengths, does not signify that this zone occupies a position corresponding to the geometric centre of the ophthalmic lens according to the invention. It simply expresses the fact that this zone of the lens is not in contact with the periphery of the ophthalmic lens but is circumscribed by the peripheral filter zone absorbing the long wavelengths. When the ophthalmic lens comprises one or more optical centres, the central zone is generally centred around this optical centre or each of these optical centres.

The central zone absorbing the short wavelengths advantageously exhibits a transmission of less than or equal to 30% for the short wavelengths comprised between 400 and 480 nm and a transmission of greater than 50% in the long wavelength range comprised between 480 nm and 700 nm. Still more advantageously, the central zone absorbing the short wavelengths exhibits a transmission of less than or equal to 20% for the short wavelengths comprised between 400 and 480 nm.

According to a preferred embodiment of the invention, the central zone is coloured yellow.

Preferentially, the peripheral zone absorbing the long wavelengths exhibits a transmission of greater than or equal to 60% in the short wavelength range comprised between 400 nm and 500 nm, and a transmission of less than 50% in the long wavelength range comprised between 500 nm and 700 nm. More preferably, the peripheral zone absorbing the long wavelengths exhibits a transmission of greater than or equal to 70% in the short wavelength range comprised between 400 nm and 500 nm.

According to a preferred embodiment of the invention, the peripheral zone is coloured blue.

In an embodiment of the invention, the ophthalmic lens is an a focal ophthalmic lens. In this embodiment, and for this type of non-corrective lens, the central zone preferably has a circular or oval shape.

In another embodiment of the invention, the ophthalmic lens is a monofocal corrective ophthalmic lens. In this type of lens, the central zone, preferably circular or oval in shape, is generally centred on the optical centre of the lens.

BRIEF DESCRIPTION OF THE DRAWINGS

FIGS. 1 and 2 represent such monofocal lenses comprising a peripheral filter zone absorbing the long wavelengths (1) surrounding a central zone (2), absorbing the short wavelengths, circular or oval in shape, centred around the optical centre C of the lens.

Advantageously, the diameter of the central circular zone, or the largest dimension of the central oval zone, is comprised between 5 and 35 mm, preferably between 10 and 25 mm, and is in particular approximately 20 mm.

In addition to the a focal and monofocal lenses, the present invention can apply to other types of lenses, in particular the progressive lenses. This type of lens is remarkable in that it has two optical zones which can be located and controlled, i.e. a far vision zone and a near vision zone, linked by a progression corridor which allows the eye to pass gently from far vision to near vision, thus providing true visual comfort for the wearer. Each of these two optical zones can be associated with a centre, called the far vision optical centre and the near vision optical centre.

Figure 1:
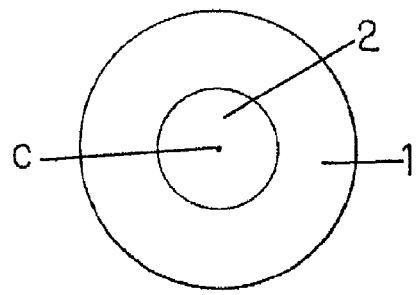
FIG. 1 represents an embodiment of the lens.
Figure 2:
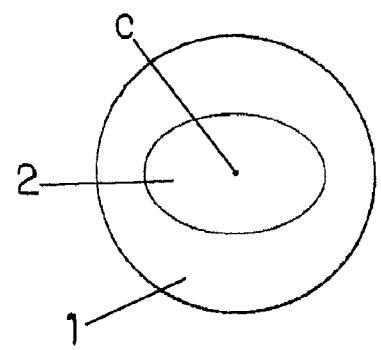
FIG. 2 represents an embodiment of the lens.
Figure 3:
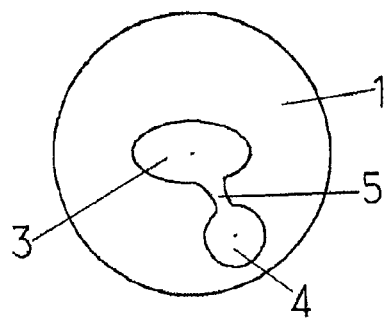
FIG. 3 represents still another embodiment of the lens.

A subject of a particular embodiment of the invention is therefore a progressive corrective ophthalmic lens with a far vision optical centre and a near vision optical centre. In the case of such a lens represented in FIG. 3, the central zone, absorbing the short wavelengths, comprises a first zone (3), preferably circular or oval in shape, essentially covering the zone around the far vision optical centre, and a second zone (4), preferably circular or oval in shape, covering the zone around the near vision optical centre, as well as a band (5) linking these two zones and corresponding to the path followed by the eye when it passes from one to the other. This band corresponds, in other words, to the abovementioned "progression corridor". The remainder of the surface of the lens is covered by the peripheral zone absorbing the long wavelengths (1).

In the case of a progressive corrective ophthalmic lens, the diameter or the largest dimension of the central zone (3) covering the far vision optical centre is preferably comprised between 5 and 35 mm, in particular between 10 and 25 mm, and still more preferably approximately 20 mm.

The central zone (4) covering the near vision optical centre is generally smaller than that corresponding to the far vision optical centre. The diameter or the largest dimension of the central zone (4) covering the near vision optical centre is advantageously comprised between 5 and 15 mm, preferably between 7 and 13 mm, and is in particular approximately 10 mm. The width of the band linking these two zones is advantageously comprised between 3 and 7 mm, preferably between 4 and 6 mm, and is in particular approximately 5 mm. In a particular embodiment of the invention, this band (5) linking the two central zones (3) and (4) can optionally have a long wavelength filter zone, i.e. a filter zone having the same characteristics as the peripheral zone (1).

The dimensions of the central zone, absorbing the short wavelengths, indicated above correspond to the ranges appropriate for most wearers of spectacles, but does not take account of individual differences. It will be easily understood that it is advantageous to limit so far as possible the dimension of the central zone to that of the zone actually explored by the human eye in order to maximize the extent of the peripheral zone absorbing the long wavelengths, essential for the regulation of the circadian rhythm. Such an optimization of the relative dimensions of the absorption zones of the short wavelengths and the absorption zones of the long wavelengths can be carried out for example using the Vision Print System technology (VPS) developed by the applicant within the context of other research into visual behaviour. This involves a device making it possible to describe the interindividual differences in eye-head coordination strategy in the visual exploration of the environment, also called "eye-head behaviour". It is thus possible to define, on the one hand individuals who are "head movers" having a tendency to follow an object visually by a movement of the head rather than by a movement of the eye, and, on the other hand, individuals who are "eye movers" having a tendency to follow an object visually by a movement of the eyes rather than with the head.

Determination of the eye-head behaviour of a wearer of spectacles, thus makes it possible to optimize the size of the central zone. If the wearer has a tendency to turn their head rather than their eyes to follow an object by sight, a central zone of 5 to 20 mm is generally sufficient to cover the whole vision zone of the lens. Conversely, if the wearer has a tendency to move their eyes rather than their head to follow an object by sight, then a central zone covering a relatively wide zone of the lens is necessary, for example a zone having a diameter comprised between 20 to 35 mm.

The peripheral zone is not necessarily adjacent to the central zone and can in principle be separated from the latter by a colourless band. However, in order so far as possible to increase the fraction of light emitted in the short wavelengths penetrating into the pupil, the peripheral zone absorbing the long wavelengths of the ophthalmic lens of the invention preferably covers the whole surface not covered by the central zone.

The tint of the central zone which is preferentially coloured yellow or of the peripheral zone which is preferentially coloured blue can have a very low intensity, and be associated with white lenses (i.e. untinted or also called "crystal" tint) for use indoors or under low light levels. The tint of these zones can also have a high intensity and be associated with sun lenses for use outside or under high light levels.

The use of the tinted filters corresponding preferentially to yellow and blue colourations on appropriate supports made of mineral or organic glass with a view to producing an ophthalmic lens according to the invention can be done for example by sublimation and/or by inkjet printing. These techniques are described for example in the patent applications WO 2006/079564 and FR 2 881 230 in the name of the applicant. It is also possible to envisage the use on a substrate of a pixelated film combined with inkjet printing technology as described in the patent application WO 2006/013250.

The present invention will be better understood on reading the following examples which illustrate the subject of the invention in a non-limitative manner.

EXAMPLE 1

Colouration of Ophthalmic Lenses According to the Invention by Inkjet Printing

40% by weight of anionic polyurethane (W234 marketed by Baxenden) is mixed under magnetic stirring with 60% by weight colloidal silica (Ludox™ 40 marketed by Aldrich). After stirring for one hour, the mixture obtained by centrifugation (spin coating) is applied to an Orma™ biplane substrate (500 revolutions/20 seconds). The deposit is dried for 1 hour at 100° C. in an oven. The thickness of the primer thus obtained is 3.6 µm. After drying, the optical lens comprising the primer and the substrate can be printed with a Canon i865 printer. The yellow and blue zones are drawn using Powerpoint™ software. The ophthalmic lens is introduced into the loading module of the printer, the latter being connected to the computer comprising the file "yellow filter—blue filter" in Powerpoint™. The printing is carried out. When the lens leaves the printer, it is immediately dried for 1 hour at 100° C. An ophthalmic lens with a yellow filter and a blue filter is obtained.

The invention claimed is:

1. An ophthalmic lens comprising on its surface,
a first, central, zone having a transmission of less than 50% in the short wavelength range comprised between 400 nm and 480 nm, and a transmission of greater than 50% in the long wavelength range comprised between 480 nm and 700 nm, and
a second, peripheral, zone having a transmission of greater than 50% in the short wavelength range comprised between 400 nm and 500 nm, and a transmission of less than 50% in the long wavelength range comprised between 500 nm and 700 nm,
wherein the ophthalmic lens is a progressive corrective ophthalmic lens with a far vision optical centre and a near vision optical centre, the central zone essentially covering the zone around the far vision optical centre and the zone around the near vision optical centre, as well as a band linking these two zones and corresponding to the path followed by the eye when it passes from one to the other, and
the diameter or the largest dimension of the central zone covering the far vision optical centre is comprised between 5 and 35 mm, preferably between 10 and 25 mm, and is in particular approximately 20 mm, the diameter or the largest dimension of the central zone covering the near vision optical centre is comprised between 5 and 15 mm, preferably between 7 and 13 mm, and is in particular approximately 10 mm, and the width of the band linking these two zones is comprised between 3 and 7 mm.

2. The ophthalmic lens according to claim 1, wherein said central zone exhibits a transmission of less than or equal to 30% for the short wavelengths comprised between 400 nm and 480 nm and a transmission of greater than 50% in the long wavelength range comprised between 480 nm and 700 nm.

3. The ophthalmic lens according to claim 1, wherein said central zone exhibits a transmission of less than or equal to 20% for the short wavelengths comprised between 400 nm and 480 nm and a transmission of greater than 50% in the long wavelength range comprised between 480 nm and 700 nm.

4. The ophthalmic lens according to claim 1, wherein the central zone is coloured yellow.

5. The ophthalmic lens according to claim 1, wherein said peripheral zone exhibits a transmission of greater than or equal to 60% in the short wavelength range comprised between 400 nm and 500 nm, and a transmission of less than 50% in the long wavelength range comprised between 500 nm and 700 nm.

6. The ophthalmic lens according to claim 1, wherein said peripheral zone exhibits a transmission of greater than or equal to 70% in the short wavelength range comprised between 400 nm and 500 nm, and a transmission of less than 50% in the long wavelength range comprised between 500 nm and 700 nm.

7. The ophthalmic lens according to claim 1, wherein the peripheral zone is coloured blue.

8. The ophthalmic lens according to claim 1, which is an afocal ophthalmic lens with the central zone being circular or oval in shape.

9. The ophthalmic lens according to claim 1, which is a monofocal corrective ophthalmic lens with the central zone being circular or oval in shape and being centred on the optical centre of the lens.

10. The ophthalmic lens according to claim 8, wherein the diameter or the largest dimension of the central zone is comprised between 5 and 35 mm.

11. The ophthalmic lens according to claim 1, wherein the peripheral filter zone absorbing the long wavelengths covers the whole surface of said ophthalmic lens not covered by the central zone absorbing the short wavelengths.

12. A method for the symptomatic treatment of the disorders linked to an alteration in the transparency of the crystalline lens and for the prophylactic treatment of the disturbance in the circadian rhythm, comprising the prescription of spectacles with ophthalmic lenses according to claim 1.

* * * * *